(12) United States Patent
Crutcher et al.

(10) Patent No.: US 12,705,746 B2
(45) Date of Patent: Aug. 11, 2026

(54) ORAL CARE BASED DIGITAL IMAGING SYSTEMS AND METHODS FOR EVALUATING AN ORAL CARE PRODUCT

(71) Applicant: The Procter & Gamble Company, Cincinnati, OH (US)

(72) Inventors: Reginald Edward Crutcher, Cincinnati, OH (US); Ted De Castro, Newton, MA (US); Jason Duff, Cincinnati, OH (US); Molly Christine Findley, Cincinnati, OH (US); Peter Middleton, Cincinnati, OH (US); Paul Albert Sagel, Maineville, OH (US); Faiz Feisal Sherman, Mason, OH (US); Dotan Weiss, Tel Aviv (IS); Darin J. Westrich, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 580 days.

(21) Appl. No.: 18/081,809

(22) Filed: Dec. 15, 2022

(65) Prior Publication Data

US 2023/0215009 A1 Jul. 6, 2023

Related U.S. Application Data

(60) Provisional application No. 63/296,181, filed on Jan. 4, 2022.

(51) Int. Cl.

| | |
|---|---|
| ***G06T 7/00*** | (2017.01) |
| ***G06Q 30/0601*** | (2023.01) |

(Continued)

(52) U.S. Cl.

CPC ....... *G06T 7/0016* (2013.01); *G06Q 30/0601* (2013.01); *G06T 7/90* (2017.01);

(Continued)

(58) Field of Classification Search

CPC ....... G06T 7/0016; G06T 7/90; G06T 11/001; G06T 2200/24; G06T 2207/30036;

(Continued)

(56) References Cited

U.S. PATENT DOCUMENTS

| | | | |
|---|---|---|---|
| 8,041,076 | B1 | 10/2011 | Bourdev |
| 8,073,212 | B2 | 12/2011 | Gerlach |

(Continued)

FOREIGN PATENT DOCUMENTS

| | | | |
|---|---|---|---|
| CN | 111091040 | A | 5/2020 |
| CN | 111191137 | A | 5/2020 |

(Continued)

OTHER PUBLICATIONS

Liu Shu et al. "Advances in computational facial attractiveness methods", Aug. 11, 2016, p. 31.

(Continued)

*Primary Examiner* — Jennifer Mehmood
*Assistant Examiner* — Vaisali Rao Koppolu
(74) *Attorney, Agent, or Firm* — John G. Powell; Elizabeth A. Conklin

(57) ABSTRACT

Oral care based digital imaging systems and methods are provided for processing information associated with image data such as a digital image and/or a video defined by a sequence of digital images. A system and a method are provided for evaluating and/or predicting the effectiveness of an oral care product to improve at least one oral health condition of at least one person depicted in a digital image.

18 Claims, 3 Drawing Sheets

(51) Int. Cl.
*G06T 7/90* (2017.01)
*G06T 11/10* (2026.01)

(52) U.S. Cl.
CPC .......... *G06T 11/10* (2026.01); *G06T 2200/24* (2013.01); *G06T 2207/30036* (2013.01)

(58) Field of Classification Search
CPC .......... G06T 2207/10016; G06T 2207/10024; G06Q 30/0601
See application file for complete search history.

(56) References Cited

U.S. PATENT DOCUMENTS

| | | | |
|---|---|---|---|
| 8,998,609 | B2 | 4/2015 | Prakash et al. |
| 9,020,236 | B2 | 4/2015 | Wang |
| 10,342,645 | B2 | 7/2019 | Salah et al. |
| 10,417,774 | B2 | 9/2019 | Salah et al. |
| 10,485,638 | B2 | 11/2019 | Salah et al. |
| 10,588,501 | B2 | 3/2020 | Salah et al. |
| 10,685,259 | B2 | 6/2020 | Salah et al. |
| 10,736,715 | B2 | 8/2020 | Salah et al. |
| 10,755,409 | B2 | 8/2020 | Salah et al. |
| 10,779,909 | B2 | 9/2020 | Salah et al. |
| 10,792,136 | B2 | 10/2020 | May et al. |
| 10,799,321 | B2 | 10/2020 | Salah et al. |
| 10,842,592 | B2 | 11/2020 | Salah et al. |
| D906,523 | S | 12/2020 | Pellissard et al. |
| 10,966,667 | B2 | 4/2021 | Salah et al. |
| 11,013,578 | B2 | 5/2021 | Salah |
| 11,049,248 | B2 | 6/2021 | Salah et al. |
| D924,398 | S | 7/2021 | Pellissard et al. |
| 11,107,218 | B2 | 8/2021 | Salah et al. |
| 11,109,945 | B2 | 9/2021 | Salah et al. |
| 11,166,543 | B2 | 11/2021 | Serval et al. |
| 11,213,120 | B2 | 1/2022 | Gatzemeyer |
| 11,246,688 | B2 | 2/2022 | Salah et al. |
| 11,314,983 | B2 | 4/2022 | Salah et al. |
| 11,357,602 | B2 | 6/2022 | Salah et al. |
| 11,361,672 | B2 | 6/2022 | Gatzemeyer |
| 11,363,971 | B2 | 6/2022 | El Kouby-benichou et al. |
| 11,628,046 | B2 | 4/2023 | Elbaz et al. |
| 2002/0048400 | A1 | 4/2002 | Leedham et al. |
| 2005/0196039 | A1 | 9/2005 | Bengel et al. |
| 2005/0244794 | A1 | 11/2005 | Kemp |
| 2009/0074679 | A1 | 3/2009 | Silverman |
| 2009/0257654 | A1 | 10/2009 | Roizen et al. |
| 2011/0014351 | A1 | 1/2011 | Reider et al. |
| 2012/0134558 | A1 | 5/2012 | Sienkiewicz |
| 2013/0243338 | A1 | 9/2013 | Palmer |
| 2015/0213622 | A1 | 7/2015 | Abdulwaheed |
| 2015/0351638 | A1 | 12/2015 | Amato |
| 2017/0172418 | A1* | 6/2017 | Munro .................. H04N 7/183 |
| 2017/0270593 | A1 | 9/2017 | Sherman et al. |
| 2018/0303579 | A1* | 10/2018 | Salah .................. A61B 1/0676 |
| 2018/0344430 | A1 | 12/2018 | Salah et al. |
| 2019/0125493 | A1 | 5/2019 | Salah et al. |
| 2019/0167115 | A1 | 6/2019 | Dorodvand et al. |
| 2019/0313963 | A1* | 10/2019 | Hillen .................. A61B 5/4547 |
| 2019/0349518 | A1* | 11/2019 | Abdulwaheed ........ G06V 20/10 |
| 2020/0022583 | A1 | 1/2020 | Jeanne et al. |
| 2020/0042769 | A1 | 2/2020 | Yan et al. |
| 2020/0187851 | A1 | 6/2020 | Offenbacher et al. |
| 2020/0334813 | A1 | 10/2020 | Salah et al. |
| 2020/0382308 | A1 | 12/2020 | Enrico et al. |
| 2020/0390335 | A1 | 12/2020 | Deane et al. |
| 2021/0004570 | A1 | 1/2021 | Zhai |
| 2021/0007834 | A1 | 1/2021 | Salah et al. |
| 2021/0019885 | A1 | 1/2021 | Jeanne et al. |
| 2021/0045858 | A1 | 2/2021 | Salah et al. |
| 2021/0052138 | A1 | 2/2021 | Bevis et al. |
| 2021/0052162 | A1 | 2/2021 | Jeanne et al. |
| 2021/0059395 | A1 | 3/2021 | Kooijman et al. |
| 2021/0068528 | A1 | 3/2021 | Nunes et al. |
| 2021/0073709 | A1* | 3/2021 | Shaw ............... G06Q 10/06395 |
| 2021/0093382 | A1 | 4/2021 | Grass et al. |
| 2021/0106409 | A1 | 4/2021 | Öjelund et al. |
| 2021/0145550 | A1 | 5/2021 | Salah et al. |
| 2021/0153836 | A1 | 5/2021 | Haase et al. |
| 2021/0161391 | A1 | 6/2021 | Deane et al. |
| 2021/0161621 | A1 | 6/2021 | Salah et al. |
| 2021/0186658 | A1 | 6/2021 | Salah et al. |
| 2021/0192724 | A1 | 6/2021 | Salah et al. |
| 2021/0259807 | A1 | 8/2021 | Salah et al. |
| 2021/0267716 | A1 | 9/2021 | Salah et al. |
| 2021/0272281 | A1 | 9/2021 | Salah et al. |
| 2021/0282634 | A1 | 9/2021 | Oren-artzi et al. |
| 2021/0366119 | A1 | 11/2021 | Salah et al. |
| 2021/0390687 | A1 | 12/2021 | Salah et al. |
| 2021/0393026 | A1 | 12/2021 | Subhash et al. |
| 2021/0401281 | A1 | 12/2021 | Salah et al. |
| 2022/0076000 | A1 | 3/2022 | Yang et al. |
| 2022/0139028 | A1 | 5/2022 | Salah et al. |
| 2022/0142749 | A1 | 5/2022 | Faranjani et al. |
| 2022/0192807 | A1 | 6/2022 | Gerhardt et al. |
| 2022/0202532 | A1 | 6/2022 | Salah et al. |
| 2022/0207748 | A1 | 6/2022 | Pham et al. |
| 2022/0222910 | A1 | 7/2022 | Salah et al. |
| 2022/0240786 | A1 | 8/2022 | Subhash et al. |
| 2022/0398731 | A1 | 12/2022 | Tavanei et al. |
| 2023/0215063 | A1 | 7/2023 | Gadiyar et al. |
| 2023/0222750 | A1 | 7/2023 | Querbes et al. |

FOREIGN PATENT DOCUMENTS

| | | | | |
|---|---|---|---|---|
| DE | 202015102709 | U1 | 8/2015 | |
| EP | 1701655 | A1 | 9/2006 | |
| EP | 3391810 | A1 | 10/2018 | |
| EP | 3432313 | A1 | 1/2019 | |
| EP | 3566673 | A1 | 11/2019 | |
| EP | 3838133 | A1 | 6/2021 | |
| EP | 3839959 | A1 | 6/2021 | |
| EP | 3858288 | A1 | 8/2021 | |
| EP | 3922134 | A1 | 12/2021 | |
| EP | 3957275 | A1 | 2/2022 | |
| EP | 4002266 | A1 | 5/2022 | |
| EP | 4009271 | A1 | 6/2022 | |
| EP | 4021305 | A1 | 7/2022 | |
| EP | 4022648 | A1 | 7/2022 | |
| FR | 3027506 | A1 | 4/2016 | |
| FR | 3083899 | A1 | 1/2020 | |
| JP | 4576325 | B2 | 8/2010 | |
| JP | 2018134418 | A | 8/2018 | |
| WO | 2013104629 | A1 | 7/2013 | |
| WO | 2020126058 | A1 | 6/2020 | |
| WO | 2021058930 | A1 | 4/2021 | |
| WO | 2021064112 | A1 | 4/2021 | |
| WO | 2021078778 | A1 | 4/2021 | |
| WO | 2021173867 | A1 | 9/2021 | |
| WO | 2021175713 | A1 | 9/2021 | |
| WO | 2021191070 | A1 | 9/2021 | |
| WO | 2021236616 | A1 | 11/2021 | |
| WO | 2021250065 | A1 | 12/2021 | |
| WO | 2021250578 | A1 | 12/2021 | |
| WO | WO-2021243640 | A1 * | 12/2021 | ........... G06Q 10/083 |
| WO | 2022008533 | A1 | 1/2022 | |
| WO | 2022020267 | A1 | 1/2022 | |
| WO | 2022053514 | A1 | 3/2022 | |
| WO | 2022106331 | A1 | 5/2022 | |
| WO | 2022140370 | A1 | 6/2022 | |
| WO | 2022152706 | A1 | 7/2022 | |
| WO | 2022152707 | A1 | 7/2022 | |
| WO | 2022159276 | A1 | 7/2022 | |

OTHER PUBLICATIONS

Zhao Jian et al. "Data-Driven Research on the Matching Degree of Eyes, Eyebrows and Face Shapes", vol. 10, Jul. 2, 2019, pp. 11.
PCT Search Report and Written Opinion for PCT/US2023/060024 dated May 3, 2023, 13 pages.

* cited by examiner

ORAL CARE BASED DIGITAL IMAGING SYSTEMS AND METHODS FOR EVALUATING AN ORAL CARE PRODUCT

FIELD OF THE INVENTION

The present invention relates to oral care based digital imaging systems and methods for processing information associated with image data such as a digital image and/or a video defined by a sequence of digital images (also known as frames). In particular, the present invention relates to a system and a method for evaluating and/or predicting the effectiveness of an oral care product to improve at least one oral health condition of at least one person depicted in a digital image.

BACKGROUND OF THE INVENTION

Typically, consumers visit a dental health professional two or fewer times a year. Thus, many consumers purchase oral care products to treat a variety of oral health conditions, such as stained teeth, gum irritation, tartar buildup, among other oral health conditions. However, it can be difficult for consumers to evaluate the effectiveness of the oral care product over a defined period of time by only casual visual observation.

Current systems of tracking performance, such as simply taking a self-photograph of one's own oral cavity with a mobile phone, do not provide the consistency in photo location, room lighting, and/or photo quality that is required to effectively track an oral care regimen impact on the oral cavity and/or provide updated recommendations for improving oral health.

Accordingly, there is a need for system and a method for evaluating and/or predicting the effectiveness of an oral care product, which can then improve the person's ability to take steps or make an informed product selection decision to improve oral health.

SUMMARY OF THE INVENTION

Disclosed herein is an oral care digital imaging computer-implemented method for evaluating effectiveness of an oral care product to improve an oral health condition in an oral cavity of a user, the method comprising: a) obtaining a first digital image comprising the oral cavity of the user with the oral health condition, wherein the oral health condition is defined by pixel data of the first digital image at a first time; b) directing the user to apply the oral care product; c) obtaining a second digital image comprising the oral cavity of the user with the oral health condition, wherein the oral health condition is defined by pixel data of the second digital image at a second time, wherein the second time is at least 1 day after the first time; and d) presenting the first digital image and the second digital image to the user, wherein the pixel data of the first digital image and the second digital image have been modified to allow the user to discern the differences between the first digital image and second digital image.

Also disclosed herein is an oral care digital imaging computer-implemented method for evaluating application of an oral care product to an oral cavity of a user, the method comprising: a) obtaining a first digital image comprising the oral cavity of the user with an oral health condition, wherein the oral health condition is defined by pixel data of the first digital image at a first time; b) presenting a modified first digital image to the user, wherein the pixel data of the first digital image have been modified to highlight locations of the oral health condition in the oral cavity of the user; c) directing the user to apply the oral care product to the oral cavity to improve the oral health conditions at the highlighted locations in the modified first digital image; d) obtaining a second digital image comprising the oral cavity of the user with the oral health condition, wherein the oral health condition is defined by pixel data of the second digital image at a second time, wherein the second time is within one hour of the application of the oral care product of the oral cavity; and e) presenting a modified second digital image to the user, wherein the pixel data of the second digital image have been modified to allow the user to determine if the oral care product has been applied sufficiently.

Also disclosed herein is an oral care digital imaging computer-implemented method for projecting effectiveness of an oral care product to improve an oral health condition in an oral cavity of a user, the method comprising: a) obtaining an initial digital image comprising the oral cavity of the user with the oral health condition, wherein the oral health condition is defined by pixel data of the initial digital image; and b) presenting the user a first projected improvement of the oral health condition to be obtained after the application of a first oral care product for a first application period.

Also disclosed herein is an oral care digital imaging computer-implemented method for evaluating effectiveness of an oral care product to improve an oral health condition in an oral cavity of a user, the method comprising: a) obtaining a first digital image comprising the oral cavity of the user with the oral health condition, wherein the oral health condition is defined by pixel data of the first digital image at a first time; b) comparing the results from the first image to a database image; c) displaying the first image and the database first image to the user; d) identifying the oral health condition; and e) directing the user to use at least one oral care product to improve the oral health condition.

Also disclosed herein is a system for providing a customized oral care product regimen through the use of the disclosed methods.

DETAILED DESCRIPTION OF THE INVENTION

Figure 1:
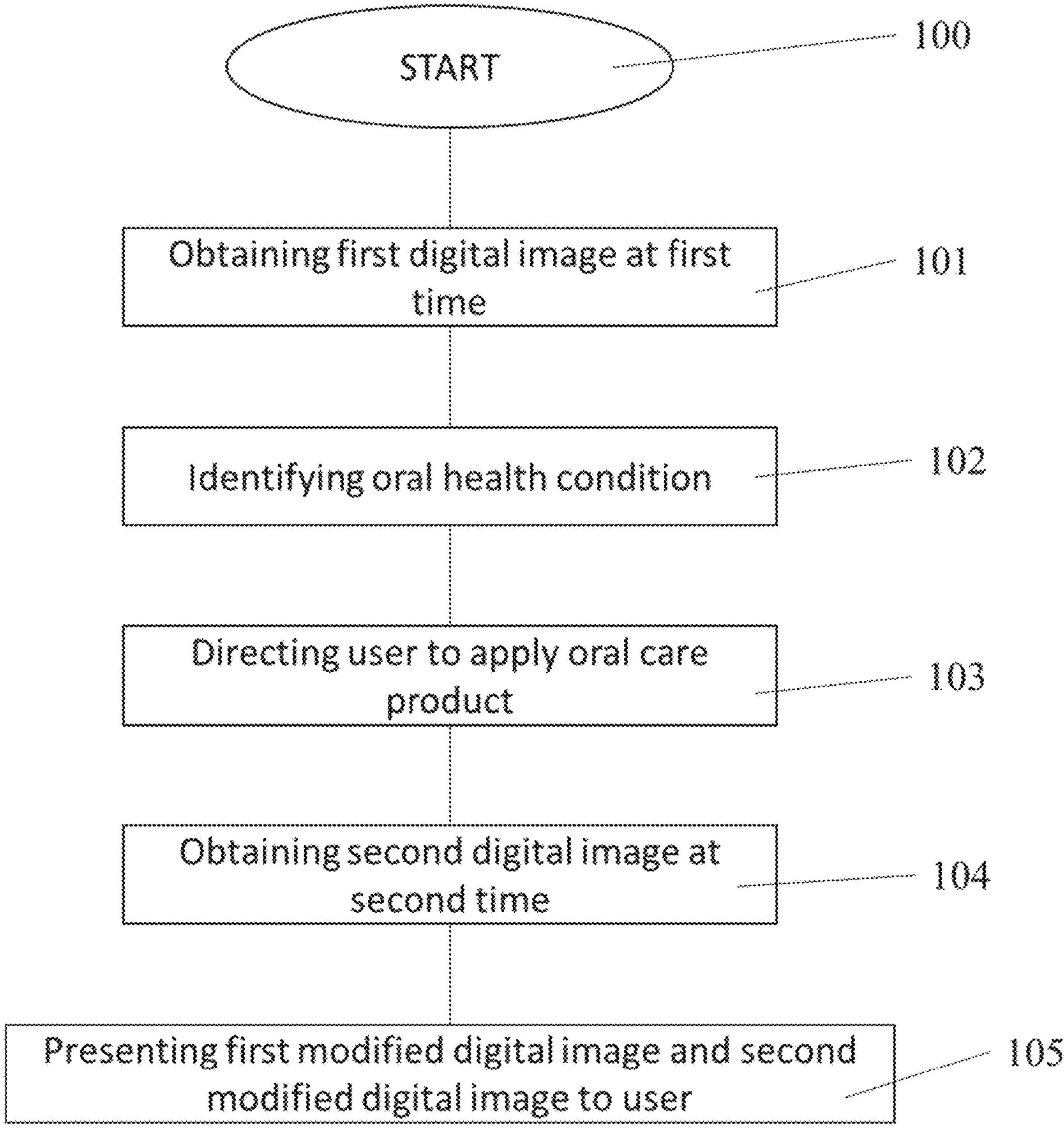
FIG. 1 is a diagram illustrating an exemplary functional block diagram associated with evaluating the performance of an oral care product

The present invention relates to a method, apparatus, device, and system evaluating and/or predicting the effectiveness of an oral care product to improve at least one oral health condition of at least one person depicted in a digital image, and a graphical user interface for visualizing and/or projecting the effectiveness of an oral care product or products to improve at least one oral health condition of at least one person/consumer. An oral cavity image portion is of an oral cavity of a person, and may comprise one or more oral cavity features, which may include mouth, teeth, gum, gingiva, tongue, cheek, or combinations thereof.

As described herein, a user can use the disclosed methods, apparatus, and systems to diagnose certain oral health conditions with or without the guided help of a dental health professional, predict/project the effectiveness of certain oral care products to improve the oral health condition(s), select customized regimens of oral care products curated to improve the oral health condition(s), evaluate the accuracy and precision of the oral care product and/or customized regimen of oral care products, and/or track and/or evaluate the effectiveness of the oral care product and/or customized regimens of oral care products using digital images of the oral cavity or manipulated images of the oral cavity to more clearly show the changes in certain attributes of the oral cavity to the user.

Oral health conditions that can be diagnosed and treated with the disclosed methods, apparatus, and systems include the whiteness/yellowness of teeth, gum recission, periodontal disease, appearance of dental plaque, tartar build up, caries, erosion, and/or combinations thereof.

Prior to describing the present invention in detail, the following terms are defined and terms not defined should be given their ordinary meaning as understood by a skilled person in the relevant art.

"Person" as used herein means a human being depicted in a digital image.

"Oral cavity feature" as used herein is an element of the mouth, and may include but is not limited to oral cavity soft tissue, gums, teeth, including, for example, as determined or detected by the pixel data or otherwise pixels of one or more corresponding digital image(s).

"Oral health condition" as used herein means all cosmetic dental attributes that provide an oral health effect on an area of the oral cavity or impact appearance and/or feel thereof. Some non-limiting examples of a cosmetic dental attribute may include gum inflammation/redness, gum firmness, gum bleeding, gum sensitivity, yellowness, lightness, front surface staining, interproximal (IP) staining in between adjacent teeth, marginal staining (around the gum line), opacity, shine, interproximal plaque, surface plaque.

"Convolutional neural network" is a type of feed-forward artificial neural network where the individual neurons are tiled in such a way that they respond to overlapping regions in the visual field.

"Oral care product" as used herein, refers to a product that includes an oral care active or regulates and/or improves a cosmetic dental attribute condition. An oral care product may include but is not limited to, toothpaste, mouth rinse, dental floss, whitening strips, gel, emulsion, brushes (manual or power), new oral care implements like mouth guards or the like.

"Digital image" as used herein, refers to a digital image formed by pixels in an imaging system including but not limited to standard RGB, or the like and under images obtained under different lighting conditions and/or modes. Non-limiting examples of a digital image include color images (RGB), monochrome images, video, multispectral image, hyperspectral image or the like. Non-limiting light conditions include white light, blue light, UV light, IR light, light in a specific wavelength, such as for example light source emitting lights from 100 to 1000 nm, from 300 to 700 nm, from 400 to 700 nm or different combinations of the upper and lower limits described above or combinations of any integer in the ranges listed above. Common wide spectral band light together with the hyperspectral camera. These Digital images can be taken by standard consumer smart phones. A digital image may be a single photograph or a single frame in a series of frames defining a video.

"Image obtaining device" as used herein, refers to a device configured for obtaining images, including but not limited to a digital camera, a photo scanner, a computer readable storage medium capable of storing digital images, and any electronic device including picture taking capabilities.

"User" as used herein refers to a person who uses at least the features provided herein, including, for example, a device user, a product user, a system user, and the like.

"Module" as used herein can be associated with software, hardware, or any combination thereof. In some implementations, one or more functions, tasks, and/or operations of modules can be carried out or performed by software routines, software processes, hardware, and/or any combination thereof.

"Heat map" as used herein refers to a graphical representation of image data comprised in a digital image in which portions of the oral cavity image portion depicted in the digital image are visually highlighted to identify targets of analysis to be presented in the image description. For example, if the target of analysis is yellowness of teeth, an area of the teeth which comprises the yellowness of teeth will be visualized.

"Treat", "Treating" as used herein refers to providing a product recommendation, customized instructions, use of a recommended product for improving oral health conditions of a subject depicted in a digital image. The subject is a person.

Intraoral Device

Disclosed herein is an intraoral device that can be configured to be reversibly coupled to an image capturing device, such as a mobile phone. The intraoral device can comprise the intraoral device of U.S. Patent Application Publication No. 2021/0282634, which is herein incorporated by reference in its entirety.

System

Disclosed herein is a system to evaluate the effectiveness of an oral care product and/or oral care regimen. The system comprises the use of an intraoral device, as described herein, by a user having a certain oral health condition, as described herein. The intraoral device can be paired with a computer-based app to help a user evaluate and/or predict the effectiveness of an oral care product to improve at least one oral health condition of at least one person depicted in a digital image. The system can comprise the system, devices, and apparatuses described in WIPO WO 2021/236616, which is herein incorporated by reference in its entirety.

Figure 2:
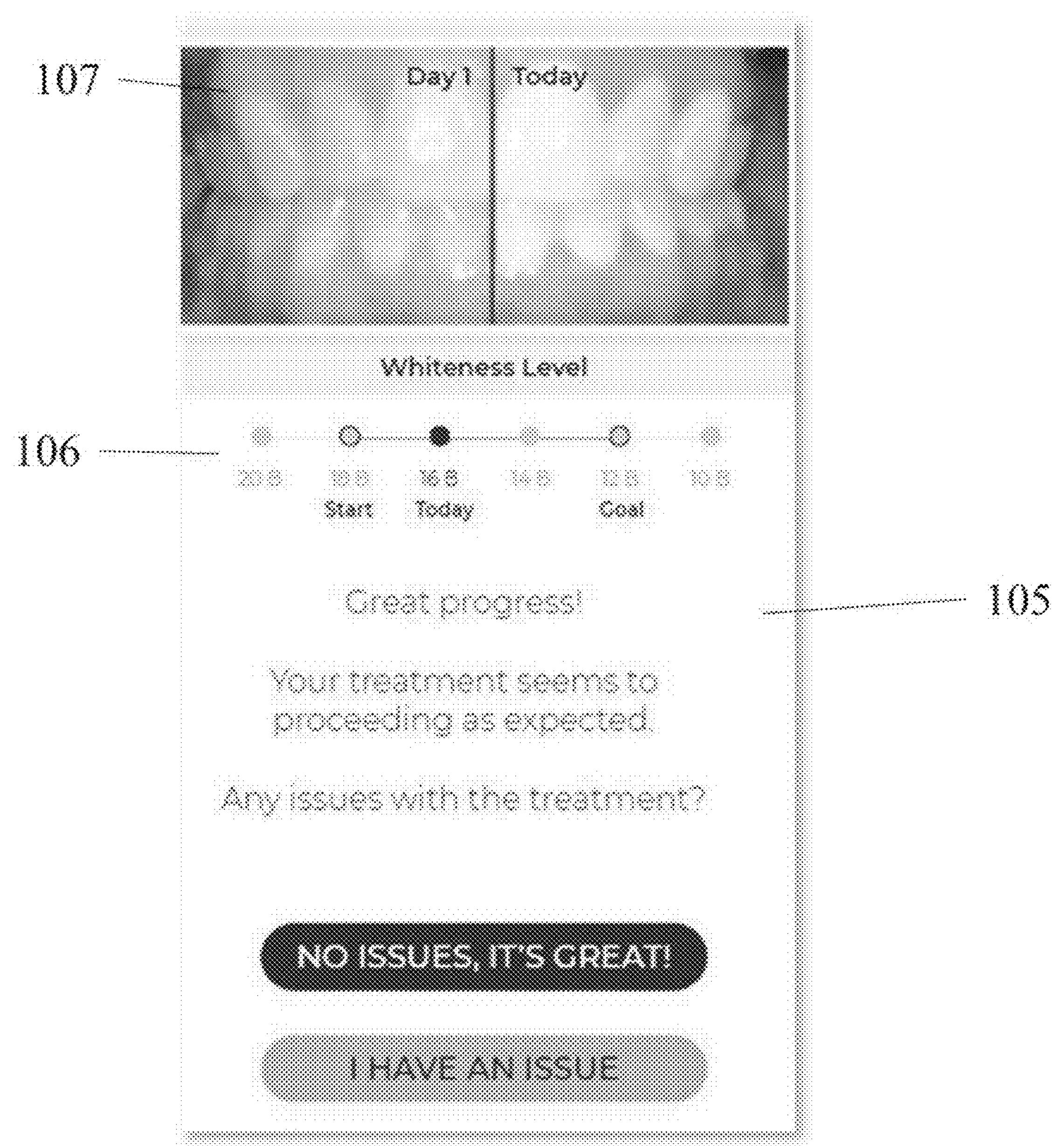
FIG. 2 is a screen shot illustrating an exemplary graphical user interface presenting a plurality of digital images to a user for visualizing the impact of the application of an oral care product on the improvement of an oral health condition.

The system can also include a graphical user interface for visualizing and/or projecting the effectiveness of an oral care product or products to improve at least one oral health condition of at least one person/consumer, as depicted in FIG. 2. The methods of use of the intraoral device in combination with an oral care product and a computer-based and/or a mobile phone-based application that can be downloaded by a user, are described herein.

Oral Health Conditions

The intraoral device, as disclosed herein, can be configured to detect, diagnose, and/or identify certain oral health conditions. Suitable oral health conditions that can be detected, diagnosed, and/or identified through use of the intraoral device, described herein, include gum inflammation/redness, gum firmness, gum bleeding, gum sensitivity, yellowness, lightness, front surface staining, interproximal (IP) staining in between adjacent teeth, marginal staining (around the gum line), opacity, shine, interproximal plaque, surface plaque, and/or combinations thereof.

In particular, disclosed herein, are methods to detect, diagnose, and/or identify certain oral health conditions that can be treated or improved by oral care products. Suitable oral health conditions include stained teeth and/or teeth that are not of the desired shade of white, accumulation of plaque and/or tartar, gingivitis, gum irritation, and/or gum bleeding, gum recission, tooth and/or gum sensitivity, caries in at least one tooth, and/or combinations thereof. Alignment of teeth in the oral cavity can be another oral health condition that can be improved.

Additionally, the intraoral device and associated disclosed methods can be used to track and evaluate an oral care product and/or oral care product regimen that is applied by a user to improve the oral health condition of interest.

For example, a user may be interested in changing the shade of white of their teeth, such as through the application of an oral care product comprising a whitening agent. The intraoral device and associated disclosed methods can be used to predict the effectiveness of certain oral care products and/or oral care regimens to provide the user a choice of effectiveness. Additionally, the intraoral device and associated disclosed methods can be used to track progress in whitening or bleaching their teeth.

Method to Evaluate Oral Care Product Effectiveness

Disclosed herein is an oral care digital imaging computer-implemented method to evaluate the effectiveness of an oral care product and/or oral care regimen on improving the oral health condition in the oral cavity of a user. It can be difficult for consumers to evaluate the effectiveness of the oral care product over a defined period of time by only casual visual observation. Thus, the disclosed method can help a user recognize the improvement of the oral health condition over a period of time.

FIG. 1 shows a diagram that illustrates an exemplary functional block diagram associated with evaluating the performance of an oral care product. As shown in FIG. 1, the user can obtain a first digital image at a first or initial time (101). The first digital image can be defined by pixel data. The user can be instructed to reversibly couple an intraoral device to an image capturing device. The user can be instructed to place their lips over a flange of the intraoral device such that a clear line of sight is available from a lens of the image capturing device to the oral cavity of the user. The user can then operate the image capturing device to obtain a first digital image (101) or set a timer to allow the image capturing device to obtain a first digital image (101) after a defined countdown sequence.

As shown in FIG. 1, the first digital image (101) can be used to identify an oral health condition (102). The oral health condition can be identified virtually by a dental health professional by providing the dental health professional with the first digital image. The dental health professional can then provide a remote diagnosis of the oral health condition, such as described in U.S. Patent Application Publication No. 2021/0282634. The oral health condition can also be identified automatically through various other algorithms, such as those described in WIPO WO 2021/236616. The oral health condition may be assigned a value, such as a level, which may be displayed to the user. As shown in FIG. 1, the user can be directed to apply a particular oral care product (103) that is expected to improve the oral health condition or an oral care product that has been recommended by a dental health professional or the computer-based application to improve the oral health condition.

The user, as shown in FIG. 1, can then obtain a second digital image at a second time (104). The second digital image can be defined by pixel data. In order to be able to discern a difference in the oral health condition between the first time and the second, the user can wait a defined period of time, such as at least about 24 hours, at least about 1 day, at least about 3 days, at least about 7 days, at least about 14 days, at least about 30 days, or at least about 1 month from the first time to the second time.

The user can then be presented in a graphical user interface a modified first digital image and a modified second digital image (105), as shown in FIG. 1. FIG. 2 shows an example of a graphical user interface (105) that the user can be shown. In FIG. 2, the first modified digital image and the second modified digital image are presented side-by-side (107) to the user. The first modified digital image ("Day 1" in FIG. 2) and the second modified digital image ("Today" in FIG. 2) are presented and cleared labeled. The graphical user interface (105) can also include a whitening level (106) to allow the user to track progress from the first time to the second time. The whitening level can also include a goal whitening level. Average whitening level can be determined through colorimetric analysis and/or comparison to a standard color diagrams, as described herein, to calculate a $\Delta L$ and/or $\Delta b$ value.

Additional digital images, such as third, fourth, fifth, sixth, etc. digital image, can be provided by the user. The user can be periodically reminded through in-application reminders or push notifications to periodically obtain a third, fourth, etc. digital image. Obtaining additional digital images can allow the user to continually track progress and/or allow the application to track compliance with the oral care regimen.

The first modified digital image and/or second modified digital image can also be presented with additional and/or alternative modifications, such as a heat map on one or more tooth surfaces, presented side-by-side next to a comparative color swatch, and/or enlarged to highlight a specific region. The heat map of the first modified digital image can include the first digital image with portions of the teeth highlighted to demonstrate yellowness of teeth, gum recession, etc. The heat map of the second modified digital image can include the second digital image with portions of the teeth highlighted to demonstrate yellowness of teeth, gum recession, etc. A comparison shown between of first heat map and a second heat map can more easily show the user the differences between the first time and the second time to demonstrate product effectiveness. The first modified digital image and/or second modified digital image can be enlarged to highlight an area or condition. The area or condition may be identified by the user, by a dental health professional, or by an algorithm.

The first digital image and the second digital image can also be provided to a dental health professional. The dental health professional can analyze the first digital image and the second digital image and provide tele-dentistry feedback and/or modify the first digital image and the second digital image to show improvement and/or additional areas of concern. The dental health professional can also provide additional feedback and/or instructions to the user on other ways to improve the oral health condition.

Method to Evaluate Oral Care Product Application

Disclosed herein is an oral care digital imaging computer-implemented method for evaluating application of an oral care product to an oral cavity of a user. FIG. 1 shows a diagram that illustrates an exemplary functional block diagram associated with evaluating the application of an oral care product.

As shown in FIG. 1, the user can obtain a first digital image at a first or initial time (101). The first digital image can be defined by pixel data. The user can be instructed to reversibly couple an intraoral device to an image capturing device. The user can be instructed to place their lips over a flange of an intraoral device such that a clear line of sight is available from a lens of the image capturing device to the oral cavity of the user. The user can then operate the image capturing device to obtain a first digital image (101) or set a timer to allow the image capturing device to obtain a first digital image (101) after a defined countdown sequence.

As shown in FIG. 1, the first digital image (101) can be used to identify an oral health condition (102). The oral health condition can be identified virtually by a dental health professional by providing the dental health professional with the first digital image. The dental health professional can then provide a remote diagnosis of the oral health condition, such as described in U.S. Patent Application Publication No. 2021/0282634. The oral health condition can also be identified automatically through various other algorithms, such as those described in WIPO WO 2021/236616. The oral health condition may be assigned a value, such as a level, which may be displayed to the user. As shown in FIG. 1, the user can be directed to apply a particular oral care product (103) that is expected to improve the oral health condition or an oral care product that has been recommended by a dental health professional or the computer-based application to improve the oral health condition.

The user, as shown in FIG. 1, can then obtain a second digital image at a second time (104). The second digital image can be defined by pixel data. For the evaluation of the application of an oral care product, the time elapsed between the first time and the second time can be shorter relative to the evaluation of the improvement of the oral care condition described above. For example, the time between the first time and the second time can be within about one minute, within about five minutes, within about ten minutes, and/or within about one hour of the application of the oral care product to the oral cavity.

The user can then be presented in a graphical user interface a modified first digital image and a modified second digital image (105), as shown in FIG. 1. Examples of modifications can include a heat map of the first digital image and/or combined with a side-by-side or overlay with a second digital image so that the user can discern whether the application of the oral care product has been sufficiently applied to all portions of the oral cavity that are experiencing the oral care condition.

The oral care product can also include a dye that can help the user visually see where the oral care product has been applied. Suitable dyes can include dyes that can absorb light in the ultraviolet spectrum, visible spectrum, and/or infrared spectrum. Suitable dyes can include dyes that absorb light with a wavelength of from about 1 nm to about 1 mm, from about 1 nm to about 1000 μm, or from about 1 nm to about 1 μm.

The graphical user interface can also include a calculated percent coverage of the oral care product over the highlighted portions of the first digital image shown in the first modified digital image.

The first digital image and the second digital image can also be provided to a dental health professional. The dental health professional can analyze the first digital image and the second digital image and provide tele-dentistry feedback and/or modify the first digital image and the second digital image to show additional areas to target that are being missed with the application. The dental health professional can also provide additional feedback and/or instructions to the user on other ways to improve the oral health condition.

Method to Predict Oral Care Product Performance

Figure 3:
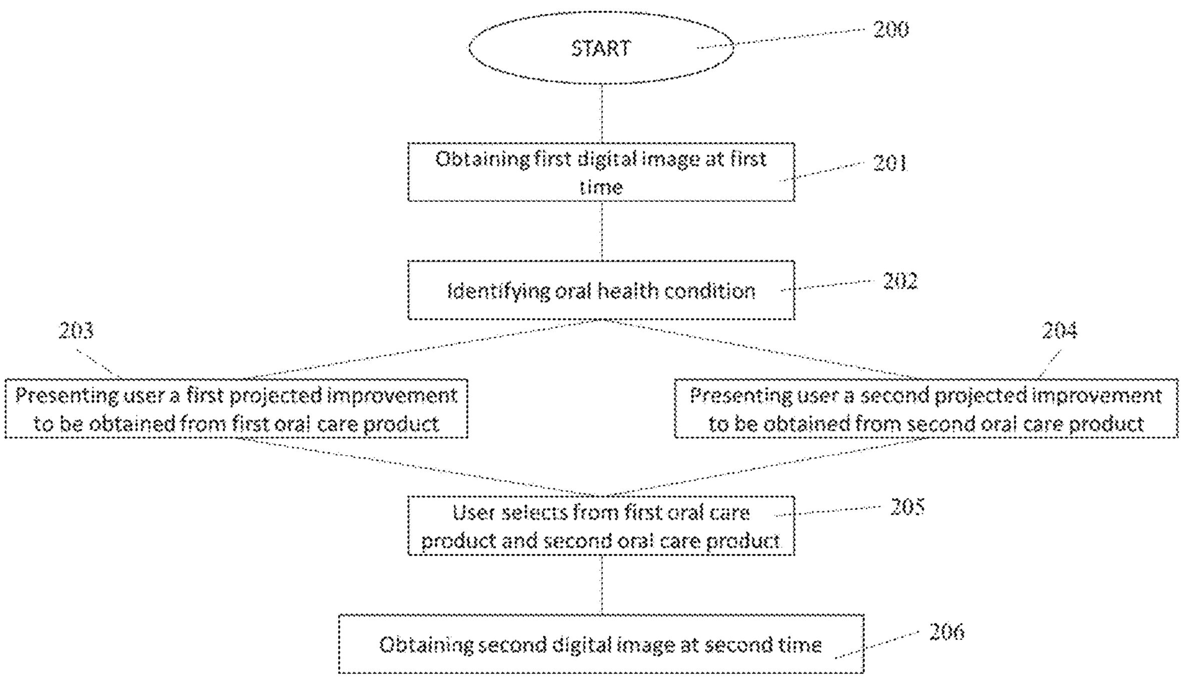
FIG. 3 is a diagram illustrating an exemplary functional block diagram associated with projecting the improvement of an oral health condition through the application of a recommended oral care product.

Disclosed herein is an oral care digital imaging computer-implemented method for projecting effectiveness of an oral care product to improve an oral health condition in an oral cavity of a user (200). FIG. 3 shows a diagram illustrating an exemplary functional block diagram associated with projecting the improvement of an oral health condition through the application of a recommended oral care product.

As shown in FIG. 3, the user can obtain a first digital image at a first or initial time (201). The first digital image can be defined by pixel data. The user can be instructed to reversibly couple the intraoral device (10) to an image capturing device (40). The user can be instructed to place their lips over the flange (22) of the intraoral device (10) such that a clear line of sight is available from a lens of the image capturing device (40) to the oral cavity of the user. The user can then operate the image capturing device (40) to obtain a first digital image (201) or set a timer to allow the image capturing device (40) to obtain a first digital image (201) after a defined countdown sequence.

As shown in FIG. 3, the first digital image (201) can be used to identify an oral health condition (202). The oral health condition can be identified virtually by a dental health professional by providing the dental health professional with the first digital image. The dental health professional can then provide a remote diagnosis of the oral health condition, such as described in U.S. Patent Application Publication No. 2021/0282634. The oral health condition can also be identified automatically through various other algorithms, such as those described in WIPO WO 2021/236616. The oral health condition may be assigned a value, such as a level, which may be displayed to the user. The user can then be presented with one or more product recommendations in a graphical user interface. The user can also be presented with a first projected improvement (203) and optionally a second projected improvement (204) of the oral health condition if the first oral care product or the second oral care product is selected by the user (205). An improvement can be projected using historical clinical data. For example, an algorithm based on historical clinical data may be configured to predict end results based on one or more conditions and a proposed treatment or regimen. The conditions can include, without limitation, a color, a plaque level, a gum health level, age, daily habits (e.g., coffee drinker, smoker, etc.), etc. The condition may be an initial condition or a second condition determined after a period of time.

The user can then proceed to track progress and/or evaluate the effectiveness of the oral care product selected, as further described herein.

Oral Care Product

Oral care products that can be used in association with the disclosed methods and system include one or more active agents that can treat a desired oral health condition. Suitable active agents include whitening agents, anticaries agent, gum health compound, antiplaque agent, antisensitivity agent, and/or combinations thereof. A particular compound can fall within more than one category. For example, stannous fluoride can fall within "anticaries agent", "gum health compound", and/or "antisensitivity agent." The active agent can also include other inactive ingredients.

The oral care product can also include implements or devices to mechanically or physically treat the oral health conditions, such as a manual and/or electric toothbrush, floss, floss picks, and the like.

Whitening Agent

The oral care product may comprise from about 0.1% to about 10%, from about 0.2% to about 5%, from about 1% to about 5%, or from about 1% to about 15%, by weight of the oral care product, of whitening agent.

The whitening agent can be a compound suitable for whitening at least one tooth in the oral cavity. The whitening agent may include peroxides, metal chlorites, perborates, percarbonates, peroxyacids, persulfates, dicarboxylic acids, as described herein, and/or combinations thereof. Suitable peroxides include solid peroxides, hydrogen peroxide, urea peroxide, polyvinylpyrrolidone peroxide complex, cross-linked polyvinylpyrrolidone peroxide complex, calcium peroxide, benzoyl peroxide, sodium peroxide, barium peroxide, inorganic peroxides, hydroperoxides, organic peroxides, and mixtures thereof. Suitable metal chlorites include calcium chlorite, barium chlorite, magnesium chlorite, lithium chlorite, sodium chlorite, and potassium chlorite. Other suitable whitening agents include sodium persulfate, potassium persulfate, peroxydone, 6-phthalimido peroxy hexanoic acid, Pthalamidoperoxycaproic acid, dicarboxylic acids, such as oxalic acid, malonic acid, methylmalonic acid, or mixtures thereof.

The whitening agent can comprise dicarboxylic acid. The dicarboxylic acid comprises a compound with two carboxylic acid functional groups. The dicarboxylic acid can comprise a compound or salt thereof defined by Formula I.

Formula I

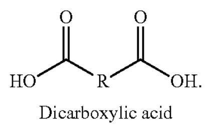

Dicarboxylic acid

R can be null, alkyl, alkenyl, allyl, phenyl, benzyl, aliphatic, aromatic, polyethylene glycol, polymer, O, N, P, and/or combinations thereof.

The dicarboxylic acid can comprise oxalic acid, malonic acid, succinic acid, glutaric acid, adipic acid, pimelic acid, suberic acid, azerlaic acid, sebacic acid, undecanedioic acid, dodecanedioic acid, brassylic acid, thapsic acid, japanic acid, phellogenic acid, equisetolic acid, malic acid, maleic acid, tartaric acid, phthalic acid, methylmalonic acid, dimethylmalonic acid, tartronic acid, mesoxalic acid, dihydroxymalonic acid, fumaric acid, terephthalic acid, glutaric acid, salts thereof, or combinations thereof. The dicarboxylic acid can comprise suitable salts of dicarboxylic acid, such as, for example, monoalkali metal oxalate, dialkali metal oxalate, monopotassium monohydrogen oxalate, dipotassium oxalate, monosodium monohydrogen oxalate, disodium oxalate, titanium oxalate, and/or other metal salts of oxalate. The dicarboxylic acid can also include hydrates of the dicarboxylic acid and/or a hydrate of a salt of the dicarboxylic acid.

The oral care product can comprise from about 0.01% to about 10%, from about 0.1% to about 15%, from about 1% to about 5%, or from about 0.0001 to about 25%, by weight of the oral care product, of dicarboxylic acid.

Anticaries Agent

The oral care product can include an anticaries agent in a therapeutic or subtherapeutic dose, such as described in U.S. Patent Application Publication No. 2021/0093528, which is herein incorporated by reference in its entirety. The anticaries agent can be active against caries through one of these four mechanisms: i) suppressing acid formation via antibacterial action; ii) reducing enamel solubility through a calcium co-ion effect; iii) reducing enamel solubility through a fluoride co-ion effect; and iv) reducing enamel solubility through surface adsorbed stabilizers. Thus, the anticaries agent can be an antibacterial agent, a calcium ion source, a fluoride ion source, a surface adsorbed stabilizer. However, a compound can fall within more than one of these categories, such as, for example, stannous chloride, which can be an antibacterial agent and a surface adsorbed stabilizer or stannous fluoride, which can be an antibacterial agent, a fluoride ion source, and a surface adsorbed stabilizer.

Suitable antibacterial agents include hops acids, such as hops alpha acids, hops beta acids, hydrogenated hops acids, and/or combinations thereof. Suitable hops beta acids can include lupulone, adlupulone, colupulone, and/or mixtures thereof. Other suitable antibacterial agents include metal ion sources, such as tin ion sources, zinc ion sources, copper ion sources, and/or combinations thereof. Other suitable antibacterial agents include triclosan, extracts from any species within the genus *Magnolia*, extracts from any species within the genus *Humulus*. Other suitable antibacterial agents include hops acids, tin ion sources, benzyl alcohol, sodium benzoate, menthylglycyl acetate, menthyl lactate, L-menthol, o-neomenthol, chlorophyllin copper complex, phenol, oxyquinoline, and/or combinations thereof. Other suitable antibacterial agents include one or more amino acids, such as basic amino acids. The oral care product can comprise from about 0.01% to about 10%, from about 1% to about 5%, or from about 0.5% to about 15% of an antibacterial agent.

Suitable surface adsorbed stabilizers include metal ion sources, such as tin ion sources, zinc ion sources, copper ion sources, aluminum ion sources, titanium ion sources and/or combinations thereof. Other suitable surface adsorbed stabilizers include bioactive materials, amino acids, and/or combinations thereof.

The oral care product can comprise fluoride. Fluoride can be provided by a fluoride ion source. The fluoride can comprise one or more fluoride containing compounds, such as stannous fluoride, sodium fluoride, titanium fluoride, calcium fluoride, calcium phosphate silicate fluoride, potassium fluoride, amine fluoride, sodium monofluorophosphate, zinc fluoride, and/or mixtures thereof. The oral care product can comprise a fluoride ion source capable of providing from about 50 ppm to about 5000 ppm, and preferably from about 500 ppm to about 3000 ppm of free fluoride ions. To deliver the desired amount of fluoride ions, the fluoride ion source may be present in the oral care producer at an amount of from about 0.0025% to about 5%, from about 0.01% to about 10%, from about 0.2% to about 1%, from about 0.5% to about 1.5%, or from about 0.3% to about 0.6%, by weight of the oral care composition.

The oral care product of the present invention can comprise calcium, such as from a calcium ion source. The calcium ion source can be any suitable compound or molecule that can provide calcium ions in an oral care composition and/or deliver calcium ions to the oral cavity when the oral care composition is applied to the oral cavity. The calcium ion source can comprise a calcium salt, a calcium abrasive, and/or combinations thereof. In some cases, a calcium salt may also be considered a calcium abrasive or a calcium abrasive may also be considered a calcium salt.

The calcium ion source can comprise a calcium abrasive. The calcium abrasive can be any suitable abrasive compound that can provide calcium ions in an oral care composition and/or deliver calcium ions to the oral cavity when the oral care composition is applied to the oral cavity. The calcium abrasive can comprise one or more calcium abrasive compounds, such as calcium carbonate, precipitated calcium carbonate (PCC), ground calcium carbonate (GCC), chalk, dicalcium phosphate, calcium pyrophosphate, and/or mixtures thereof.

The calcium ion source can comprise a calcium salt, or a compound that can provide calcium ions in an oral care composition and/or deliver calcium ions to the oral cavity when the oral care composition is applied to the oral cavity that can not act as an abrasive. The calcium salt can comprise one or more calcium compounds, such as calcium chloride, calcium nitrate, calcium phosphate, calcium lactate, calcium oxalate, calcium oxide, calcium gluconate, calcium citrate, calcium bromide, calcium iodate, calcium iodide, hydroxyapatite, fluorapatite, calcium sulfate, calcium glycerophosphate, and/or combinations thereof.

The oral care product can comprise from about 5% to about 70%, from about 10% to about 50%, from about 10% to about 60%, from about 20% to about 50%, from about 25% to about 40%, or from about 1% to about 50% of a calcium ion source.

Gum Health Compound

The active agent can comprise a gum health compound. The gum health can decrease gum irritation, prevent gingival recession, stop gingival recession, reverse gingival recession, decrease gum recession, increase gingival barrier protection, promote collagen synthesis, promote extracellular matrix synthesis, increase gum resilience protection, increase epidermal thickness and/or promote fibrillin synthesis, and/or combinations thereof in an oral cavity of a user.

Suitable gum health compounds include metal ion source, vitamin, such as retinoid compound, gum strengthening polyol, or combinations thereof.

As used herein, "vitamin" includes all natural and/or synthetic analogs of vitamins, vitamers, compounds and/or derivatives that exhibit the biologically activity of vitamins, isomers of these compounds, stereoisomers of these compounds, salts of these compounds, or combinations thereof.

Suitable vitamins for gum health can include Vitamin A, such as retinoid compound, Vitamin B, including Vitamin B1 (thiamine), Vitamin B2 (riboflavin), Vitamin B3 (niacin), Vitamin B5 (pantothenic acid), Vitamin B6, Vitamin B7 (biotin), Vitamin B9 (folic acid and/or folate), Vitamin B12 (cyanocobalamin), Vitamin C, Vitamin D, Vitamin E, Vitamin K, and/or combinations thereof. Vitamins can also include other vitamin-like compounds, such as choline, carnitine, or combinations thereof. The oral care product can comprise from about 0.0001% to about 10%, from about 0.01% to about 5%, or from about 0.01% to about 2%, by weight of the composition, of vitamin.

The gum health compound can comprise one or more retinoid compounds. As used herein, "retinoid compound" includes all natural and/or synthetic analogs of Vitamin A or retinol-like compounds that possess the biological activity of Vitamin A in the skin as well as the geometric isomers and stereoisomers of these compounds. The retinoid compound can, for example, be retinol, retinyl esters (e.g., C—C alkyl esters of retinol, including retinyl palmitate, retinyl acetate, retinyl propionate), retinal, and/or retinoic acid (including all-trans retinoic acid and/or 13-cis-retinoic acid). In some embodiments, retinoids other than retinoic acid are used. These compounds are available in the art and are commercially available from several sources, e.g., Sigma Chemical Company (St. Louis, Mo.), and Boehringer Mannheim (Indianapolis, Ind.). Other suitable retinoids are tocopheryl-retinoate, tocopherol ester of cis- or trans-retinoic acid, adapalene (6-3-(1-adamantyl)-4-methoxyphenyl-2-naphthoic acid), and tazarotene (ethyl 6-2-(4.4-dimethylthiochroman-6-yl)-ethynylnicotinate). Desirable retinoids include retinol, retinoic acid, retinyl palmitate, retinyl acetate, retinyl propionate, retinal, and combinations thereof.

The retinoid compound may be included as the substantially pure material, or as an extract obtained by suitable physical and/or chemical isolation from natural (e.g., plant) sources. The retinoid compound can be substantially pure, or essentially pure. The compositions of this invention may contain a safe and effective amount of the retinoid compound, such that the oral care product is safe and effective for regulating or improving the condition of keratinous tissues and accidental ingestion since applied to the oral cavity.

The retinoid compound can comprise retinol, retinyl ester, retinal, retinoic acid, tocopheryl-retinoate, tocopherol ester of cis- or trans-retinoic acid, isotretinoin, alitretinoin, etretinate, acitretin, adapalene, bexarotene, tazarotene, or combinations thereof. The retinoid compound can be pharmaceutical grade, USP, or the like grade, due to use in the oral cavity. The retinoid compound and/or the retinol can have a purity of at least about 95%, at least about 97%, at least about 99%, at least about 99.5%, or at least about 99.9%. The oral care product can comprise from about 0.0001% to about 10%, from about 0.01% to about 5%, or from about 0.01% to about 2%, by weight of the composition, of retinoid compound. The oral care composition can comprise from about 1 ppm to about 10,000 ppm, from about 500 ppm to about 5000 ppm, from about 750 ppm to about 5000 ppm, from about 1000 ppm to about 2500 ppm, about 1500 ppm, or about 2250 ppm of retinoid compound. Amounts of retinoid compound that are greater than about 5000 ppm are thought to lead to toxicity concerns for formulating with oral care compositions, which would not be present in skin care compositions.

The retinoid compound can comprise retinol comprising cis- and/or trans-alkene functional groups. The retinol can comprise at least about 80%, at least about 90%, at least about 95%, and/or at least about 99% of trans-alkene functional groups. The retinoid compound can also comprise surfactant, such as anionic surfactant, cationic surfactant, and/or nonionic surfactant, which can improve gum barrier permeability. Suitable surfactants can include polysorbate.

The gum health compound can comprise a metal. The metal can be provided by a metal ion source. The metal ion source can comprise tin, zinc, copper, or combinations thereof. The metal can provide a gum health benefit. The oral care product can comprise from about 0.01% to about 5%, from about 0.1% to about 10%, from about 0.001% to about 1%, from about 0.2% to about 1%, from about 0.5% to about 1.5%, or from about 0.3% to about 0.6%, by weight of the oral care product, of the metal and/or metal ion source.

The metal can comprise tin, which can be provided by a tin ion source. The tin ion source can be any suitable compound that can provide tin ions in an oral care composition and/or deliver tin ions to the oral cavity when the dentifrice composition is applied to the oral cavity. The tin ion source can comprise one or more tin containing compounds, such as stannous fluoride, stannous chloride, stannous bromide, stannous iodide, stannous oxide, stannous sulfate, stannous sulfide, stannic fluoride, stannic chloride, stannic bromide, stannic iodide, stannic sulfide, and/or mixtures thereof. Preferably, the tin ion source can comprise stannous fluoride, stannous chloride, and/or mixture thereof.

The oral care product can comprise from about 0.01% to about 5%, from about 0.1% to about 10%, from about 0.001% to about 1%, from about 0.2% to about 1%, from about 0.5% to about 1.5%, or from about 0.3% to about 0.6%, by weight of the oral care product, of the tin and/or tin ion source.

The metal of can comprise zinc, which can be provided by a zinc ion source. The zinc ion source can comprise one or more zinc containing compounds, such as zinc fluoride, zinc lactate, zinc oxide, zinc phosphate, zinc chloride, zinc acetate, zinc hexafluorozirconate, zinc sulfate, zinc tartrate, zinc gluconate, zinc citrate, zinc malate, zinc glycinate, zinc pyrophosphate, zinc metaphosphate, zinc oxalate, and/or zinc carbonate.

The oral care product can comprise from about 0.01% to about 5%, from about 0.1% to about 10%, from about 0.001% to about 1%, from about 0.2% to about 1%, from about 0.5% to about 1.5%, or from about 0.3% to about 0.6%, by weight of the oral care product, of the zinc and/or zinc ion source.

Antiplaque Agent

The active agent can comprise antiplaque agent. Suitable antiplaque agents can include abrasives, polyphosphates, pyrophosphate, chlorhexidine, quaternary ammonium compounds, and/or combinations thereof.

The antiplaque agent can comprise polyphosphate, which can be provided by a polyphosphate source. A polyphosphate source can comprise one or more polyphosphate molecules. Polyphosphates are a class of materials obtained by the dehydration and condensation of orthophosphate to yield linear and cyclic polyphosphates, such as phytic acid, of varying chain lengths. Thus, polyphosphate molecules are generally identified with an average number (n) of polyphosphate molecules, as described below. A polyphosphate is generally understood to consist of two or more phosphate molecules arranged primarily in a linear configuration, although some cyclic derivatives may be present.

Preferred polyphosphates are those having an average of two or more phosphate groups so that surface adsorption at effective concentrations produces sufficient non-bound phosphate functions, which enhance the anionic surface charge as well as hydrophilic character of the surfaces. Preferred in this invention include the linear polyphosphates having the formula: $XO(XPO_3)_nX$, wherein X is sodium, potassium, ammonium, or any other alkali metal cations and n averages from about 2 to about 21, from about 2 to about 14, or from about 2 to about 7.

Some examples of suitable polyphosphate molecules include, for example, pyrophosphate (n=2), tripolyphosphate (n=3), tetrapolyphosphate (n=4), sodaphos polyphosphate (n=6), hexaphos polyphosphate (n=13), benephos polyphosphate (n=14), hexametaphosphate (n=21), which is also known as Glass H. Polyphosphates can include those polyphosphate compounds manufactured by FMC Corporation, ICL Performance Products, and/or Astaris.

The oral care product can comprise from about 0.01% to about 15%, from about 0.1% to about 10%, from about 0.5% to about 5%, from about 1 to about 20%, or about 10% or less, by weight of the oral car eproduct, of the polyphosphate source. Alternatively, the oral care product can be essentially free of, substantially free of, or free of polyphosphate. The oral care product can be essentially free of, substantially free of, or free of cyclic polyphosphate. The oral care producer can be essentially free of, substantially free of, or free of phytic acid, which can lead to insoluble tin and/or zinc compounds.

Antisensitivity Agent

The active agent can comprise antisensitivity agent. Suitable antisensitivity agents include potassium nitrate, dicarboxylic acid, such as oxalic acid, tin, and/or combinations thereof.

Oral Care Product Forms

Suitable compositions for the delivery of the active agent include emulsion compositions, such as the emulsions compositions of U.S. Patent Application Publication No. 2018/0133121, which is herein incorporated by reference in its entirety, unit-dose compositions, such as the unit-dose compositions of U.S. Patent Application Publication No. 2019/0343732, which is herein incorporated by reference in its entirety, leave-on oral care compositions, jammed emulsions, such as the jammed oil-in-water emulsions of U.S. Pat. No. 11,096,874, which is herein incorporated by reference in its entirety, dentifrice compositions, mouth rinse compositions, mouthwash compositions, tooth gel, subgingival gel, mouth rinse, mousse, foam, mouth spray, lozenge, chewable tablet, chewing gum, tooth whitening strips, floss and floss coatings, breath freshening dissolvable strips, denture care products, denture adhesive products, or combinations thereof. The active agent can also be placed on a non-dissolvable strip, such as the delivery system of U.S. Pat. No. 5,891,453, which is herein incorporated by reference in its entirety.

Methods of Applying Oral Care Product

The oral care product comprising active agent, as described herein, can lead to the improvement of oral health conditions, such as the whitening of teeth, removing stain from teeth, and/or preventing the accumulation of stain from teeth when applied to the oral cavity. For example, a user can dispense at least a one-inch strip of a suitable oral care product, as described herein, onto an oral care implement, such as a toothbrush, applicator, and/or tray, and apply the oral care product to the oral cavity and/or teeth.

If a toothpaste or dentifrice composition is used, the user can be instructed to brush teeth thoroughly for at least 30 seconds, at least one minute, at least 90 seconds, or at least two minutes at least once, at least twice, or at least three times per day. The user can also be instructed to expectorate the oral care product after the completion of the brush procedure.

The user can also be instructed to rinse with a mouthwash composition comprising active agent and/or mouth rinse composition comprising active agent after the completion of the brush procedure or instead of the brush procedure. The user can be instructed to swish the oral care composition thoroughly for at least 30 seconds, at least one minute, at least 90 seconds, or at least two minutes at least once, at least twice, or at least three times per day. The user can also be instructed to expectorate the oral care product after the completion of the procedure.

The oral care product of the present invention can be used to provide a whitening benefit, such as the whitening of teeth, removing stain from teeth, and/or preventing the accumulation of stain from teeth. The oral care product can include primary packaging, such as a tube, bottle, and/or tub. The primary package can be placed within secondary package, such as a carton, shrink wrap, or the like. Instructions for use of the oral care composition can be printed on the primary package and/or the secondary package. The scope of the method is intended to include instructions provided by a manufacturer, distributor, and/or producer of the oral care composition.

If the oral care composition is a toothpaste, the user can be instructed to dispense the toothpaste from the toothpaste tube. The user can be instructed to apply a portion of the toothpaste onto a toothbrush. The portion of the toothpaste can be of any suitable shape, such as strip, a pea-sized amount, or various other shapes that would fit onto any mechanical and/or manual brush head. The user can be instructed to apply a strip of the toothpaste that is at least about 1 inch, at least about 0.5 inch, at least 1 inch, and/or at least 0.5 inch long to the bristles of a toothbrush, such as soft-bristled toothbrush.

The user can be instructed to brush their teeth for at least about 30 seconds, at least about 1 minute, at least about 90 seconds, at least about 2 minutes, at least 30 seconds, at least 1 minute, at least 90 seconds, and/or at least 2 minutes.

The user can be instructed to brush their teeth thoroughly and/or as directed by a dental health professional. The user can be instructed to brush their teeth after each meal. The user can be instructed to brush their teeth at least once per day, at least twice per day, and/or at least three times per day. The user can be instructed to brush their teeth no more than three times a day, such as to prevent cationic antimicrobial induced staining. The user can be instructed to brush their teeth in the morning and/or in the evening prior to sleeping.

The user can be instructed to not swallow the toothpaste composition due to the inclusion of ingredients that are not suitable for ingestion, such as fluoride. The user may be instructed to expectorate (or spit out) the toothpaste composition after the cessation of the brushing cycle.

If the oral care composition is a mouth rinse, the user can be instructed to dispense the mouth rinse from a bottle containing the mouth rinse. The user can be instructed to use the mouth rinse at least once a day, at least twice a day, and/or at least three times a day. The user can be instructed to use the mouth rinse composition after the use of toothpaste and/or floss.

The user can be instructed to swish a portion of rinse in the oral cavity, such as between the teeth, for a period of time. The user can be instructed to vigorously swish a portion of the rinse.

The user can be instructed to use be from about 5 mL to about 50 mL, from about 10 mL to about 40 mL, 10 mL, 20 mL, 25 mL, 30 mL, 40 mL, 2 teaspoonfuls, and/or 4 teaspoonfuls of mouth rinse.

The user can be instructed to swish the mouth rinse for at least about 30 seconds, at least about 1 minute, at least about 90 seconds, at least about 2 minutes, at least 30 seconds, at least 1 minute, at least 90 seconds, and/or at least 2 minutes.

The user can be instructed to not swallow the mouth rinse composition due to the inclusion of ingredients that are not suitable for ingestion, such as fluoride. The user may be instructed to expectorate (or spit out) the mouth rinse composition after the cessation of the rinse cycle.

The usage instructions for the oral care product, such as for a toothpaste composition and/or a mouth rinse composition, can vary based on age. For example, adults and children that are at least 6 or at least 2 can have one usage instruction while children under 6 or under 2 can have a second usage instruction.

Suitable medicaments include oral care compositions, toothpaste compositions, mouth rinse compositions, floss coatings, chewing gums, and/or other suitable compositions to be applied in the oral cavity.

Oral Care Regimen

If multiple active agents are used, such as for example, a whitening agent and an antisensitivity agent, each active agent can be delivered in a single composition or in two separate compositions. For example, a first composition can comprise tin and/or fluoride and a second composition and or device, such as a whitening strip, can comprise peroxide. The first and second composition can be delivered simultaneously, such as in a dual-phase composition or sequentially from discrete compositions. An oral care kit can include the first composition comprising tin and/or fluoride and the second composition comprising peroxide. The oral care kit can also include instructions directing a user to apply the first composition to an oral cavity of the user followed by applying the second composition to the oral cavity of the user. The instructions can accompany the kit or be provided in one or more computer-implemented methods. The first composition can be expectorated prior to the application of the second composition or the second composition can be applied prior to the expectoration of the first composition from the oral cavity.

The entire oral care regimen can have a duration of from one minute to about three minutes with each application step having a duration of from about 30 seconds to about 2 minutes or about 1 minute.

The components can be delivered to the oral cavity simultaneously or sequentially. The simplest case is simultaneous, continuous delivery of equal amounts of the two components or a constant ratio of the components during a single oral care session. The two components may be provided separately, such as in a dual-phase composition in two separate compositions, and then delivered simultaneously to the oral cavity. Brushing duration is sufficiently short so that the components will not be inactivated. Another use for simultaneous, continuous delivery is systems that include two components that react relatively slowly, and that will remain in the oral cavity after brushing to be absorbed by the teeth and or gums.

In the case of sequential delivery, both components may be delivered during a single oral care session, e.g., a single brushing session or other single treatment session (single use, start to finish, by a particular user, typically about 0.1 to 5 minutes), or alternatively the components may be delivered individually over multiple oral care sessions. Many combinations are possible, for example delivery of both components during a first oral care session and delivery of only one of the components during a second oral care session.

Sequential delivery during a single oral care session may take various forms. In one case, two components are delivered in alternation, as either a few relatively long duration cycles during brushing (A B A B), or many rapid-fire alternations (A B A B A B A B A B . . . A B).

In another case, two or more components are delivered one after the other during a single oral care session, with no subsequent alternating delivery in that oral care session (A followed by B). For example, a first composition comprising fluoride and/or tin can be delivered initially, to initiate brushing and provide cleansing, followed by a second composition comprising peroxide.

Other steps can also be included in the regimen, such as peroxide activation via electromagnetic radiation, flossing, and/or manual removal of stain and/or plaque through one or more dental instruments.

Customized Oral Care Product Regimen

Upon identification and tracking of the oral health regimen, the computer-implemented methods, as described herein can also provide recommendations for customized product regimens for individual users.

For example, the user can be presented with a series of oral care products that provide a whitening benefit. If the user experiences sensitivity to certain oral care products, a specific regimen can be presented to the user that slowly increases the dose of the whitening agent to minimize gum irritation and/or tooth sensitivity.

The user can also be presented an oral care product with a fast acting whitening benefit, such as an oral care product that provides a $\Delta b^*$ or $\Delta L$ of at least about-2 within 14 days followed by an oral care product that provides a maintenance whitening benefit.

The computer-implemented methods, as described herein can also provide recommendations for customized product regimens can provide recommendations for a suite of oral care products to improve more than one oral health condition, such as reduction in stain and reduction in gum recission.

FIG. 1 is a diagram illustrating an exemplary functional block diagram associated with evaluating the performance of an oral care product FIG. 2 is a screen shot illustrating an exemplary graphical user interface presenting a plurality of digital images to a user for visualizing the impact of the application of an oral care product on the improvement of an oral health condition.

FIG. 3 is a diagram illustrating an exemplary functional block diagram associated with projecting the improvement of an oral health condition through the application of a recommended oral care product.

Combinations

A. An oral care digital imaging computer-implemented method for evaluating effectiveness of an oral care product to improve an oral health condition in an oral cavity of a user, the method comprising:

a) obtaining a first digital image comprising the oral cavity of the user with the oral health condition, wherein the oral health condition is defined by pixel data of the first digital image at a first time;

b) directing the user to apply the oral care product;

c) obtaining a second digital image comprising the oral cavity of the user with the oral health condition, wherein the oral health condition is defined by pixel data of the second digital image at a second time, wherein the second time is at least 1 day after the first time;

d) presenting the first digital image and the second digital image to the user, wherein the pixel data of the first digital image and the second digital image have been modified to allow the user to discern the differences between the first digital image and second digital image.

B. The method of A, wherein the oral health condition comprises stained teeth and/or teeth that are not of the desired shade of white.

C. The method of A, wherein the oral health condition comprises accumulation of plaque and/or tartar, gingivitis, gum irritation, and/or gum bleeding, gum recission, tooth and/or gum sensitivity, caries in at least one tooth, and/or combinations thereof.

D. The method of any one of A to C, wherein the second time is at least 7 days, at least 14 days, or at least 30 days after the first time.

E. The method of any one of A to D, wherein the modification of the first digital image and the second digital image comprises a heat map of the first digital image and a heat map of the second digital image, preferably wherein the method comprises manipulating the first digital image to create a first heat map and manipulating the second digital image to create a second heat map, or more preferably wherein the method comprises presenting the first heat map and the second heat map to the user.

F. The method of any one of A to E, wherein the modification of the first digital image and the second digital image comprises analyzing the first digital image to generate an average first comparative color swatch from the first digital image and analyzing the second digital image to generate a second comparative color swatch from the second digital image, preferably wherein the method comprises presenting the first comparative color swatch and the second comparative color swatch to the user.

G. The method of any one of A to F, the modification of the first digital image and the second digital image comprises analyzing the first digital image to calculate a first average whitening level using colorimetric analysis and analyzing the second digital image to calculate a second average whitening level using colorimetric analysis, preferably wherein the method comprises presenting the first average whitening level and the second average whitening level to the user, or more preferably wherein the method comprises presenting the first average whitening level and the first time side-by-side to the second average whitening level and the second time.

H. The method of any one of A to G, wherein the method comprises:

e) presenting the first digital image and the second digital image to a dental health professional, preferably wherein method also comprises:

f) providing feedback to the user on the improvement of the oral health condition and/or additional instructions on how to further improve the oral health condition.

I. The method of any one of A to H, wherein the method comprises:

e) obtaining a third digital image comprising the oral cavity of the user with the oral health condition, wherein the oral health condition is defined by pixel data of the third digital image at a third time, wherein the third time is at least 1 day after the second time; and f) presenting the first digital image, the second digital image, and the third digital image to the user, wherein the pixel data of the first digital image, the second digital image, and third digital image have been modified to allow the user to discern the differences between the first digital image, the second digital image, and the third digital image.

J. The method of any one of A to I, wherein b) comprises presenting the user a first projected improvement of the oral health condition to be obtained after the application of the oral care product for a first application period, preferably wherein the user is presented an option to select between a first oral care product and a second oral care product.

K. The method of J, wherein the user is presented a first projection of a first level of improvement of the oral health condition if the first oral care product is selected and applied in accordance with a first series of instructions, preferably wherein the user is presented a second projection of a second level of improvement of the oral health condition if the second oral care product is selected and applied in accordance with a second series of instructions.

L. The method of K, wherein the user is presented the first projection and the second projection side-by-side, preferably wherein the user is prompted to select between the first oral care product and second oral care product.

M. An oral care digital imaging computer-implemented method for evaluating application of an oral care product to an oral cavity of a user, the method comprising:

a) obtaining a first digital image comprising the oral cavity of the user with an oral health condition, wherein the oral health condition is defined by pixel data of the first digital image at a first time;

b) presenting a modified first digital image to the user, wherein the pixel data of the first digital image have been modified to highlight locations of the oral health condition in the oral cavity of the user;

c) directing the user to apply the oral care product to the oral cavity to improve the oral health conditions at the highlighted locations in the modified first digital image;

d) obtaining a second digital image comprising the oral cavity of the user with the oral health condition, wherein the oral health condition is defined by pixel data of the second digital image at a second time, wherein the second time is within one hour of the application of the oral care product of the oral cavity;

e) presenting a modified second digital image to the user, wherein the pixel data of the second digital image have been modified to allow the user to determine if the oral care product has been applied sufficiently.

N. The method of M, wherein the oral health condition comprises stained teeth and/or teeth that are not of the desired shade of white.

O. The method of M, wherein the oral health condition comprises accumulation of plaque and/or tartar, gingivitis, gum irritation, and/or gum bleeding, gum recission, tooth and/or gum sensitivity, caries in at least one tooth, and/or combinations thereof.

P. The method of any one of M to O, wherein the method comprises:

f) presenting the first digital image and the second digital image to a dental health professional, preferably wherein the method comprises:

g) providing feedback to the user on the improvement of the oral health condition and/or additional instructions on how to further improve the oral health condition.

Q. The method of any one of M to P, wherein the oral care product comprises a dye, preferably wherein the dye absorbs light in the ultraviolet spectrum, visible spectrum, the infrared spectrum, or a combination thereof, or more preferably wherein the dye absorbs light with a wavelength of from about 10 nm to about 1000 μm.

R. The method of any one of M to Q, wherein the modified second digital image comprises an overlay of the second digital image and the modified first digital image, preferably wherein the method comprises:

f) calculating a percent coverage of the oral care product over the highlighted locations in the modified first digital image.

S. The method of any one of M to R, wherein the method comprises:

f) obtaining a third digital image comprising the oral cavity of the user with the oral health condition, wherein the oral health condition is defined by pixel data of the third digital image at a third time, wherein the third time is at least 1 day after the first time;

g) presenting the first digital image and the third digital image to the user, wherein the pixel data of the first digital image and the third digital image have been modified to allow the user to discern the differences between the first digital image and third digital image.

T. The method of any one of M to S, wherein the third time is at least 7 days, at least 14 days, or at least 30 days after the first time.

U. The method of any one of claims M to T, wherein the modification of the first digital image and the third digital image comprises a heat map of the first digital image and a heat map of the third digital image, preferably wherein the method comprises manipulating the first digital image to create a first heat map and manipulating the third digital image to create a second heat map, or more preferably wherein the method comprises presenting the first heat map and the second heat map to the user.

V. An oral care digital imaging computer-implemented method for projecting effectiveness of an oral care product to improve an oral health condition in an oral cavity of a user, the method comprising:

a) obtaining an initial digital image comprising the oral cavity of the user with the oral health condition, wherein the oral health condition is defined by pixel data of the initial digital image; and b) presenting the user a first projected improvement of the oral health condition to be obtained after the application of a first oral care product for a first application period.

W. The method of V, wherein the method comprises:

c) presenting the user a second projected improvement of the oral health condition to be obtained after the application of a second oral care product for a second application period, d) presenting the first projected improvement and the second project improvement side-by-side to the user.

X. The method of V or W, wherein the oral health condition comprises stained teeth and/or teeth that are not of the desired shade of white.

Y. The method of any one of V to X, wherein the oral health condition comprises accumulation of plaque and/or tartar, gingivitis, gum irritation, and/or gum bleeding, gum recission, tooth and/or gum sensitivity, caries in at least one tooth, and/or combinations thereof.

Z. The method of any one of V to Y, wherein the method comprises:

c) obtaining a first digital image comprising the oral cavity of the user with the oral health condition, wherein the oral health condition is defined by pixel data of the first digital image at a first time, wherein the first time is at least 1 day after the application of the first oral care product;

d) presenting the first digital image and the initial digital image to the user, wherein the pixel data of the first digital image and the initial digital image have been modified to allow the user to discern the differences between the first digital image and initial digital image.

AA. The method of any one of V to Z, wherein the first time is at least 7 days, at least 14 days, or at least 30 days after the application of the first oral care product.

AB. The method of any one of V to AA, wherein the method comprises:

e) presenting the first digital image and the first projected improvement to the user, wherein the pixel data of the first digital image and the first projected improvement have been modified to allow the user to discern the differences between the first digital image and first projected improvement, preferably wherein the method comprises:

f) presenting the first digital image and the second digital image to a dental health professional, or more preferably wherein the method comprises:

g) providing feedback to the user on the improvement of the oral health condition and/or additional instructions on how to further improve the oral health condition.

AC. The method of any one of V to AB, wherein the method comprises:

d) obtaining a second digital image comprising the oral cavity of the user with the oral health condition, wherein the oral health condition is defined by pixel data of the second digital image at a second time, wherein the second time is at least 1 day after the first time; and e) presenting the first digital image and the second digital image to the user, wherein the pixel data of the first digital image and the second digital image have been modified to allow the user to discern the differences between the first digital image and second digital image.

AD. The method of AC, wherein the modification of the first digital image and the second digital image comprises a heat map of the first digital image and a heat map of the second digital image, preferably wherein the method comprises manipulating the first digital image to create a first heat map and manipulating the second digital image to create a second heat map, or more preferably wherein the method comprises presenting the first heat map and the second heat map to the user.

AE. The method of claim AC, wherein the modification of the first digital image and the second digital image comprises analyzing the first digital image to generate an average first comparative color swatch from the first digital image and analyzing the second digital image to generate a second comparative color swatch from the second digital image, preferably wherein the method comprises presenting the first comparative color swatch and the second comparative color swatch to the user.

AF. The method of claim AC, the modification of the first digital image and the second digital image comprises analyzing the first digital image to calculate a first average whitening level using colorimetric analysis and analyzing the second digital image to calculate a second average whitening level using colorimetric analysis, preferably wherein the method comprises presenting the first average whitening level and the second average whitening level to the user, or more preferably wherein the method comprises presenting the first average whitening level and the first time side-by-side to the second average whitening level and the second time.

AG. An oral care digital imaging computer-implemented method for evaluating effectiveness of an oral care product to improve an oral health condition in an oral cavity of a user, the method comprising:

a) obtaining a first digital image comprising the oral cavity of the user with the oral health condition, wherein the oral health condition is defined by pixel data of the first digital image at a first time;

b) comparing the results from the first digital image to a database image;

c) displaying the first image and the database first digital image to the user;

d) identifying the oral health condition; and e) directing the user to use at least one oral care product to improve the oral health condition.

AH. The method of AG, wherein the method comprises:

f) obtaining a second digital image comprising the oral cavity of the user with the oral health condition, wherein the oral health condition is defined by pixel data of the second digital image at a second time, wherein the second time is at least 1 day after the first time; and g) presenting the first digital image and the second digital image to the user, wherein the pixel data of the first digital image and the second digital image have been modified to allow the user to discern the differences between the first digital image and second digital image.

AI. The method of claim AG or AH, wherein the method comprises:

h) comparing the results from the second digital image to a second database image, preferably wherein the method comprises:

i) presenting the first database image and the second database image to the user, wherein the pixel data of the first database image and the second database image have been modified to allow the user to discern the differences between the first database image and second database image.

AJ. The method of claim A through AH, wherein the oral care product is an oral care implement.

AK. The method of claim A through AH, comprising showing a level of the oral health condition.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An oral care digital imaging computer-implemented method for evaluating effectiveness of an oral care product to improve an oral health condition in an oral cavity of a user, the method comprising:

a) obtaining a first digital image comprising the oral cavity of the user with the oral health condition, wherein the oral health condition comprises stained teeth and/or teeth that are not of the desired shade of white, and wherein the oral health condition is defined by pixel data of the first digital image at a first time;

b) directing the user to apply the oral care product;

c) obtaining a second digital image comprising the oral cavity of the user with the oral health condition, wherein the oral health condition is defined by pixel data of the second digital image at a second time, wherein the second time is at least 1 day after the first time; and d) modifying the first digital image and the second digital image to allow the user to discern a difference between the first digital image and second digital image, wherein the modification comprises manipulating the first digital image to create a first heat map and manipulating the second digital image to create a second heat map, and wherein the modification further comprises analyzing the first digital image to generate an average first comparative color swatch and analyzing the second digital image to generate a second comparative color swatch.

2. The method of claim 1, wherein the second time is at least 7 days after the first time.

3. The method of claim 2, wherein the second time is at least 14 days after the first time.

4. The method of claim 1, wherein the oral health condition comprises accumulation of plaque and/or tartar, gingivitis, gum irritation, and/or gum bleeding, gum recession, tooth and/or gum sensitivity, caries in at least one tooth, and/or combinations thereof.

5. The method of claim 1, further comprising presenting the first comparative color swatch as a representative visual sample of color and the second comparative color swatch as a representative visual sample of color to the user.

6. The method of claim 1, wherein the modification of the first digital image and the second digital image comprises analyzing the first digital image to calculate a first average whitening level using colorimetric analysis and analyzing the second digital image to calculate a second average whitening level using colorimetric analysis.

7. The method of claim 6, further comprising presenting the first average whitening level and the second average whitening level to the user.

8. The method of claim 7, further comprising presenting the first average whitening level and the first time side-by-side to the second average whitening level and the second time.

9. The method of claim 1, further comprising:

e) presenting the first digital image and the second digital image to a dental health professional.

10. The method of claim 9, further comprising:

f) providing feedback to the user on the improvement of the oral health condition and/or additional instructions on how to further improve the oral health condition.

11. The method of claim 1, further comprising:

e) obtaining a third digital image comprising the oral cavity of the user with the oral health condition, wherein the oral health condition is defined by pixel data of the third digital image at a third time, wherein the third time is at least 1 day after the second time; and f) presenting the first digital image, the second digital image, and the third digital image to the user, wherein the pixel data of the first digital image, the second digital image, and third digital image have been modified to allow the user to discern the difference between the first digital image, the second digital image, and the third digital image.

12. The method of claim 1, wherein b) comprises presenting the user a first projected improvement of the oral health condition to be obtained after the application of the oral care product for a first application period.

13. The method of claim 12, further comprising presenting the user an option to select between a first oral care product and a second oral care product.

14. The method of claim 13, further comprising presenting the user a first projection of a first level of improvement of the oral health condition if the first oral care product is selected and applied in accordance with a first series of instructions and presenting the user a second projection of a second level of improvement of the oral health condition if the second oral care product is selected and applied in accordance with a second series of instructions.

15. The method of claim 14, wherein the first projection and the second projection are presented side-by-side.

16. The method of claim 15, further comprising prompting the user to select between the first oral care product and the second oral care product.

17. The method of claim 1, further comprising presenting the first and second modified images side-by-side next to their comparative color swatch.

18. The method of claim 1, wherein obtaining at least one of the first and second digital images comprises using an intraoral device reversible coupled to an image capturing device.

* * * * *